July 26, 1938.  G. W. PENNEY  2,125,083
VALVE CONTROL SYSTEM
Filed Dec. 18, 1934    3 Sheets-Sheet 1

WITNESSES:

INVENTOR
Gaylord W. Penney.
BY
Paul E. Friedemann
ATTORNEY

July 26, 1938.  G. W. PENNEY  2,125,083
VALVE CONTROL SYSTEM
Filed Dec. 18, 1934  3 Sheets-Sheet 3

WITNESSES:

INVENTOR
Gaylord W. Penney.
BY
Paul E. Friedemann
ATTORNEY

Patented July 26, 1938

2,125,083

UNITED STATES PATENT OFFICE 2,125,083

VALVE CONTROL SYSTEM

Gaylord W. Penney, Pittsburgh, Pa., assignor to Westinghouse Electric & Manufacturing Company, East Pittsburgh, Pa., a corporation of Pennsylvania Application December 18, 1934, Serial No. 758,042

19 Claims. (Cl. 188—88)

My invention relates to control systems for valves and more particularly to control systems for valves adapted to control the pressure of a fluid in a compression chamber.

In devices for controlling motor operated valves, the apparatus and the method of operation are, as a rule, complicated and often not reliable.

One object of my invention is to provide for controlling a valve or a plurality of valves, by motor means, in a simple and reliable manner.

Another object of my invention is to maintain the fluid pressure in a chamber, containing a fluid, substantially constant.

Another and somewhat more specific object of my invention is to control the operation of a valve disposed in a duct means leading from a chamber containing a fluid under high pressure to a region of low fluid pressure in such a manner that the pressure in the chamber containing the fluid under high pressure is maintained substantially constant.

In order to absorb or minimize shocks to a vehicle traveling on a road bed, hydraulic shock absorbers are frequently used. Those hydraulic shock absorbers have valves for controlling the flow of liquid from a chamber of high liquid pressure to a chamber of low liquid pressure. The valves of such devices are in some instances controlled by the inertia of a mass, but no provision is made in such control for the valves to maintain a substantially constant liquid pressure in the compression chamber or a pressure proportional to the acceleration of the sprung mass of the vehicle.

One object of my invention, therefore, is to control the liquid pressure in the compression chamber of a hydraulic shock absorber in a predetermined manner.

My invention also has particular utility in connection with devices utilizing pressure multiplying valves, and one object of my invention is to provide for controlling the pressure multiplication of a multiplying valve.

A more specific object of my invention is to maintain the multiplication of a multiplier valve within a given range.

A further object of my invention is to provide for controlling the relative effect of a multiplier valve and an inertia controlled valve.

Another object of my invention is to by-pass the main portion of the fluid from a control valve through an auxiliary valve, whereby only that portion of the fluid required for control purposes, to control the pressure in a chamber, passes through the control valve. The control valve may thus be made relatively small.

It is also an object of my invention to maintain the multiplication of a multiplier valve within a certain range of any value of multiplication selected.

Other objects and advantages of my invention will become more apparent from a study of the following specification, when considered in conjunction with the accompanying drawings, in which.

Figure 1:
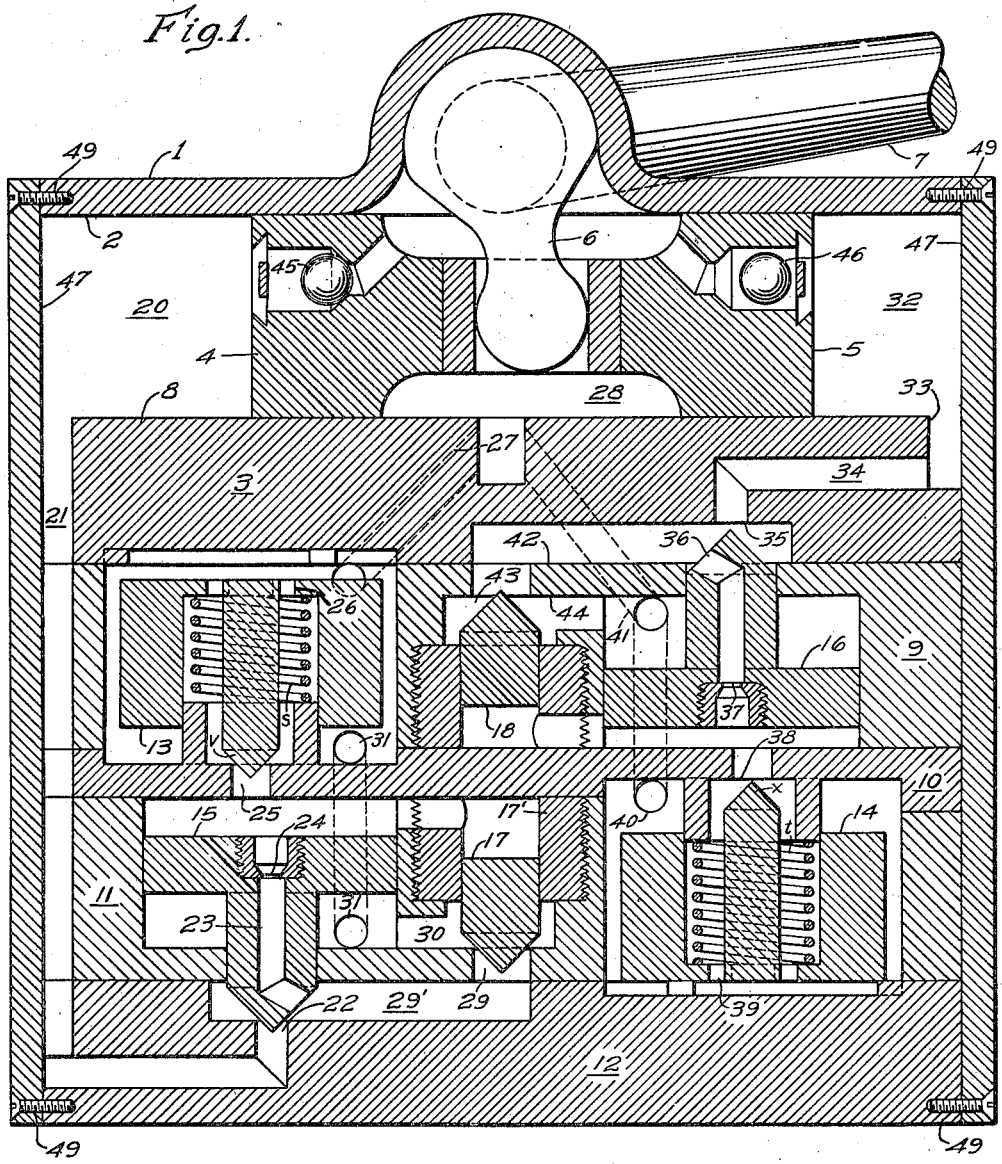
Figure 1 is a longitudinal sectional view of a hydraulic shock absorber using my control means in combination with an inertia controlled valve and a pressure multiplying valve.

Referring more particularly to Fig. 1 of the drawings, the reference character 1 designates a casing of a hydraulic shock absorber utilized in connection with the absorbing of shocks of a vehicle travelling over a road bed. As is usual in the mounting of shock absorbers of the hydraulic type, the casing 1 may be considered as mounted on the sprung mass of the vehicle, whereas the actuating member or lever for operating the shock absorber may be considered as suitably coupled to the unsprung mass. The details of such mounting are common knowledge and need not be shown.

The casing 1 is provided with an upper cylindrical portion 2 and a lower base member 3 consisting of the parts 8, 9, 10, 11 and 12 for housing the means adapted to be operated by the pistons 4 and 5 disposed in the cylindrical member and operated by the movement of the sprung mass. The pistons 4 and 5 are provided with ball check valves 45 and 46, respectively. When the pistons are at rest there is a free flow of the fluid or liquid from the supply chamber 28 to the compression chambers 20 and 32 and the various ducts and valves in the casing member 3.

Mounted in the casing member 3 are a pair of weights or masses 13 and 14 provided with valve members $v$ and $x$ for controlling the flow of fluid through the openings 25 and 38, respectively, in response to the inertia of the respective masses. The chambers containing the masses 13 and 14 are suitably connected to the supply reservoir by conduits 27, 40 and 41. The masses are held in balanced positions by the springs $s$ and $t$. Spring $s$ is a compression spring, whereas spring $t$ is a tension spring.

Each valve controlled by the masses 13 and 14 has a multiplier valve 15 and 16 disposed in series relation with the openings 25 and 38, respectively.

The multiplier valve 15 has a removable member in the piston portion thereof having an orifice 24 for providing a restriction to flow of fluid through the conduit 23 of the valve 15. The valve 16, being similar to the valve 15, also has a removable member provided with an orifice 37 for restricting the flow of fluid or liquid through the conduit 36 of the valve 16. The multiplier valve 15 controls the flow of fluid through the opening 22, whereas the multiplier valve 16 controls the flow of fluid through the opening 35. If it be assumed that the piston 4 is moving toward the left, liquid is caused to flow from the compression chamber 20 through conduit 21, opening 22 controlled by the multiplier valve 15, duct 23 disposed longitudinally of the multiplier valve, the orifice 24, opening 25 controlled by the mass 13 operating the valve $v$, and ducts 26 and 27 to the supply reservoir 28. Fluid may also flow, after having passed through the opening 22 into the region 29′, through the opening 29 controlled by the valve 17 and then through conduits 30, 31 and 27 to the supply reservoir 28.

When the piston 5 is moved toward the right, fluid in the compression chamber 32 may pass through the conduits 33 and 34, the opening 35 controlled by the multiplier valve 16, conduit 36 disposed longitudinally of the multiplier valve, orifice 37, opening 38 controlled by the mass 14 acting on valve $x$, and conduits 39, 40 and 41 to the supply reservoir 28. Fluid may also flow through the conduit 42, the opening 43 controlled by the valve 18 to chamber 44 and then through conduit 41 to the supply reservoir 28.

In Fig. 1, the various valves have been shown in the position they would occupy when the wheels of a vehicle have passed over a raised portion in the road bed, and have fully compressed the springs of the vehicle, and the sprung mass is accelerating in an upward vertical direction with an increasing vertical velocity. Under these conditions, the pistons 4 and 5 will be moving toward the left, and the weight 13 will tend to close the opening 25 as a function of the upward vertical acceleration of the sprung mass.

To fully explain my contribution to the art attention is called to the following relations:

Let $A^{25}$ = the area of the valve acted upon by the fluid passing through opening 25;
$A^{22}$ = the area of the portion of valve 15 acted upon by the flow of fluid through the conduit 22;
$A^{29}$ = the area of the valve 17 subjected to the fluid pressure in the region 29′;
$A^{15}$ = the area of the upper or piston portion of the multiplier valve 15, namely, the area subjected to the liquid pressure above the piston portion of the valve 15;
$A^{23}$ = the area of the lower or stem portion of the valve 15, which is subjected to the pressure of the liquid in the region 29′;
$A^{17}$ = the area of the valve 17 subjected to the pressure of the liquid above the piston portion of the multiplier valve 15.

Let $R^{25}$, $R^{22}$ and $R^{29}$ = the resistances to flow of liquid, or fluid, effected by the valves controlling the openings 25, 22 and 29, respectively;
$R^{24}$ = the resistance to flow of fluid through the orifice 24.
Let $P^{15}$ = the pressure of the liquid, or fluid, in the region above the piston portion of the valve 15;
$P^{29}$ = the pressure of the fluid or liquid acting on the stem portion of the multiplier valve 15, namely, the pressure in region 29′; and
$P^{20}$ = the pressure of the fluid, or liquid, in the compression chamber 20.

In the inertia type of shock absorber as shown in Fig. 1, the pressure on the valve closing the opening 25 is determined by the acceleration of the mass 13 acting on valve $v$. This pressure in the chamber above the piston portion of the valve 15 is then multiplied by having a large piston area. With a fixed resistance, as $R^{24}$, between the region 29′ and the upper portion of the valve 15 the force acting on the valve at the opening 22 is equal to $$P^{20} \times A^{22} = P^{15} \times A^{15} - P^{29} \times A^{23}, \text{ i. e.,}$$
$$P^{20} A^{22} = P^{15} A^{15} - P^{29} A^{23} \quad (1)$$

Let F equal the rate of flow (assuming viscous flow), then $P^{15} = FR^{22}$.
Then $P^{29} = F(R^{22} + R^{24})$, approximately $$P^{29} = P^{15} \frac{R^{22} + R^{24}}{R^{22}} \quad (2)$$

Substituting (2) in (1)

$$P^{20} = P^{15} \left( \frac{A^{15}}{A^{22}} - \frac{A^{29}}{A^{15}} \frac{R^{22} + R^{24}}{R^{22}} \right)$$

If $$\frac{A^{15}}{A^{22}} = 64,$$

and $$\frac{A^{29}}{A^{22}} = 8,$$

then in order to prevent multiplication of pressure during the free flow condition, namely, when there is piston movement and no acceleration of the sprung mass, $R^{24}$ must be made seven times the value of $R^{25}$ when the valve $v$ controlled by the mass 13 is wide open. The multiplication, namely, the ratio of $$\frac{P^{20}}{P^{15}},$$

is then determined by the ratio of $R^{25}$ to $R^{24}$, namely, it is determined by the amount of opening of the valve $v$. Such an arrangement thus provides a multiplication from a ratio of 56 down to zero with various positions of the valve $v$ controlled by the mass 13.

From this it is evident that the multiplication ratio decreases as the valve $v$ opens so that with a large rate of flow and a small acceleration force of the sprung mass the valve $v$ is forced wide open and the multiplication is reduced to zero.

To prevent this improper or disadvantageous operation and, namely, to retain an appropriate multiplication by the multiplier valve when there is any acceleration at all of the sprung mass, namely, the casing 1, the valve 17 is utilized to aid in the control of the fluid flowing from the compression chamber 20. If $A^{17}$ is made = $2 \times A^{29}$, then the valve 17 will open at the conduit 29 as soon as the pressure $P^{15}$ becomes less than twice the pressure of $P^{29}$, which occurs when $R^{25}$ becomes less than $R^{24}$. With valve $v$ closed or nearly closed the valve 17 will remain closed, but if the valve $v$ is forced open until its resistance is less than $R^{24}$, valve 17 will open sufficiently to carry off the excess fluid so that as long as any force acts on valve $v$ it will open only to the point where $R^{25}$ is equal to $R^{24}$, thus giving a multiplication ratio for the dimensions chosen, not less than 48, but, nevertheless, providing for a zero force acting on the valve $v$ during free-flow conditions, and thus providing no multiplication when there is no vertical acceleration of the casing 1. In other words, the valve 17 keeps the working range of the multiplication of the multiplier valve 15 between 56 and 48 for all rates of flow instead of varying from 56 to zero.

For free flow, the multiplication is zero with or without the valve 17, but, inasmuch as valve 17 can be made large, the resistance in series with valve 15 at the opening 22 can be made small, while without valve 17 all of the fluid must pass through the orifice 24 and through the valve $v$, which imposes a considerable resistance to flow.

The relative dimensions hereinbefore given are merely illustrative and not to be interpreted in a limiting sense, because the upper section of the area of the valve 15 with reference to its other dimensions may be varied at will. Similarly, the cross-sectional area of the opening 25 may be made any value and the cross-sectional area of the opening 29 may be made any value desired.

To facilitate in the adjustment of my system of control for different ranges of multiplication, the valve 17 is shown to be operable in a removable guide nut 17'. The upper area of the valve 17 may thus be varied, thereby giving a different range of operation for the multiplying valve 15.

Assuming that the casing 1 is accelerating in a vertical direction and that pistons 4 and 5 are moving toward the left, thereby compressing the liquid in the compression chamber 20 and forcing the liquid through the conduit 21 to the valve opening 22. During upward vertical accelerations of the casing 1, the valve $v$ will tend to close the opening 25 and in consequence liquid, or fluid, passing through the opening 22 will pass through the restricting orifice 24 into the region above the piston portion of valve 15. Since the opening 25 is restricted as a function of the vertical acceleration of the mass, the flow of fluid through the opening 22 will be restricted as a function of the vertical acceleration modified by the ratio of multiplication of the multiplier valve.

For comparatively rapid movements of the piston 4 toward the left and comparatively small vertical acceleration of the casing, the tendency would be to force valve $v$ completely open, thus providing a free-flow condition through the opening 25, when, as a matter of fact, it is desirable to have a shock absorber action during such stage of operation. This is accomplished, as heretofore indicated by the mathematical relation given, by the use of valve 17. For a rapid motion of the piston toward the left but a small upward vertical acceleration, the resisting force of valve $v$ will be comparatively small. The resistance at valve opening 22 will, as for every condition of its useful working cycle, be determined by the resistance of valve $v$, the resisting force of orifice 24 and the multiplication ratio. When the resistance of valve $v$ becomes less than the resisting force of orifice 24, the pressure is relieved above piston 15 and valve 17 opens relieving the pressure in chamber 29' and thus relieving the force on the stem portion of valve 15. The valve 15 will thus move down restricting the flow of liquid, or fluid, through opening 22. It is thus clear that when the resisting force of valve $v$ tends to be less or equal to the resistance of the orifice 24, the pressure in chamber 20 is primarily determined by the orifice 24 because this orifice determines for the instant the positions of all the valves controlling the flow from compression chamber 20. The shock absorber action will thus change from inertia control to a constant value.

More concisely stated, as the pressure above the piston portion 15 decreases by reason of the opening of the valve $v$, the valve 17 will permit a flow of fluid or liquid through the opening 29 just sufficient to prevent full opening of the valve $v$. The multiplication ratio is therefore, limited in range by the operation of the valve 17. The liquid thus forced through the opening 22 will also pass through the opening 29 and the conduits 31 and 27 to the supply reservoir 28.

When the conditions are reversed, namely, when there is a downward vertical acceleration of the casing 1 and the piston 5 is moving toward the right, liquid in the compression chamber 32 will be forced through the conduits 33 and 34 and opening 35. The opening 35 will, however, be acted upon by the multiplier valve 16 by reason of the fact that the inertia control valve $x$, for downward acceleration, closes the opening 38. Associated with the valves $x$ and 16 is an additional valve 18 similar to the valve 17 which functions to control the flow of liquid through the opening 43 and thus also maintains the multiplication range, for the multiplication selected, within a certain range. In fact, valve 18 similarly prevents an excessive decrease of the ratio of multiplication.

To prevent escape of any liquid, the end portions 47 are securely held against the casing 1 by the screws 49.

Figure 2:
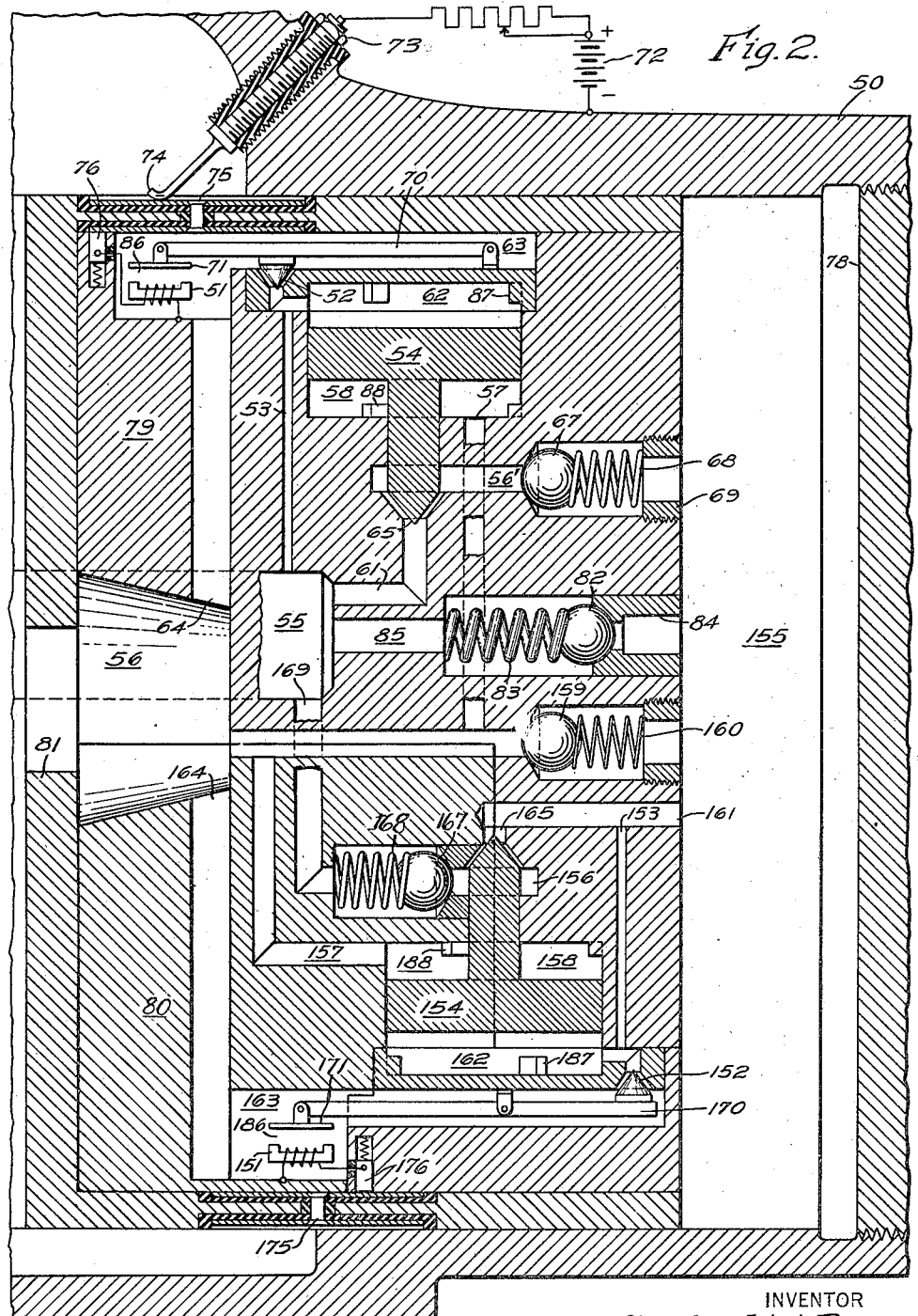
Fig. 2 shows a longitudinal sectional view of an end portion of a hydraulic shock absorber provided with electric control means and multiplier valves.
Figure 3:
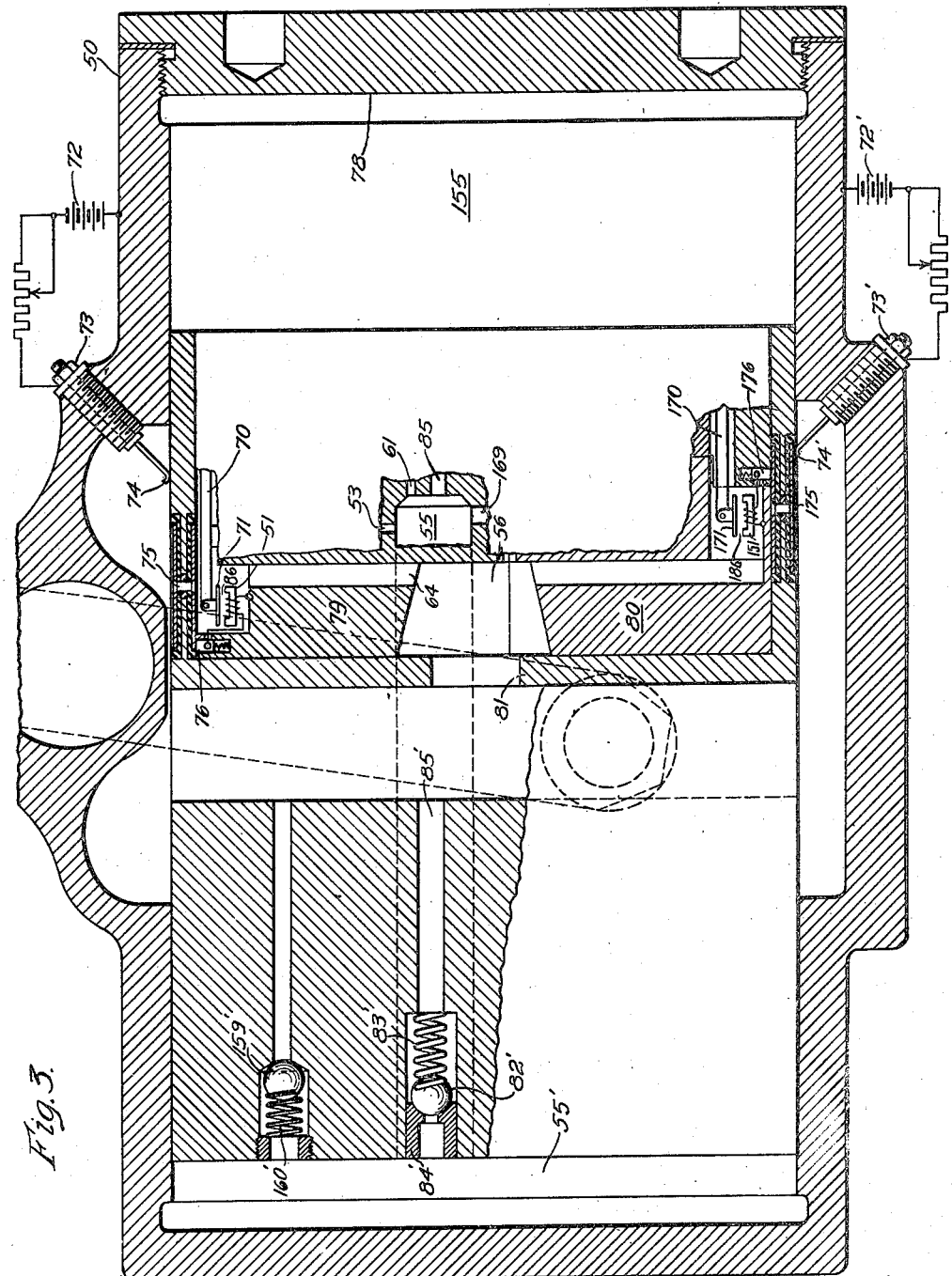
Fig. 3 is a view of the entire cylinder, shown in part in Fig. 2 and, at broken away portions, illustrates the parts not shown in Fig. 2.

Referring to the modification shown in Fig. 2, 50 represents the end portion of the casing of a hydraulic shock absorber. The modification is shown in section, and Fig. 2 shows the right-hand end of the piston which, in this modification, carries the operating valves for controlling the pressure in the compression chambers 55 and 155. As shown in Fig. 3 compression chamber 55 is in direct communication with the fluid displacement, or fluid compression, chamber 55' at the left of the piston. The structures of this modification and the theory of operation can probably be best understood from a study of the sequence of operation during a shock absorbing action of the shock absorber.

Assuming that the unsprung mass, namely, the wheels and the axle, etc., have been moved vertically to compress the springs of the vehicle, and that the sprung mass of the vehicle is in a state of upward vertical acceleration so that the piston will at such time be moving toward the left, thereby subjecting the liquid in the left-hand end of the casing 50, namely, the liquid in the compression chamber 55 connected with the left-hand end, to pressure. In Fig. 2 the piston is shown as having moved a small distance toward the left. Under such compression, a ball check valve 159' shown in Fig. 3 at the left end of the piston and being similar to 159 shown in Fig. 2, closes thereby preventing a flow of fluid from the compression chamber 55' to the low pressure regions 56 and 155. Liquid will thus be forced through the conduit 61, the valve 65, conduit 56', and spring biased valve 67 to the chamber 155. The valve 67 is biased to the position shown by a spring 68 having a compression or a force greater than the force of the spring 160 acting on valve 159 but less than the force exerted by the spring 83 on the pressure relief valve 82. The fluid pressure necessary to unseat valves 159, 67 and 82 will thus vary in magnitude in the order in which the valves are here mentioned.

When the liquid in compression chamber 55 is subjected to pressure and disregarding for the moment valve 52, the comparatively small conduit 53 permits liquid to flow through the region 62 to thereby cause a pressure to be exerted on the upper area of the piston portion of the multiplier valve 54 to thus close the valve opening 65. By suitably controlling the pressure in the region 62, the pressure in the high pressure compression chamber 55 may either be maintained constant or maintained at a value determined by the variations that may be imposed upon the comparatively small pressure on the fluid in the region 62.

To maintain the pressure constant in the pressure chamber 55, a valve 52 is disposed to control the pressure of the liquid in the region 62. This valve 52 is mounted on a lever 70 actuated by an armature 71, which is in turn controlled by a solenoid or an electromagnet 51. The valve opening 52 may be changed considerably by a very small change in the position of the lever 70, and since the air gap 86 is chosen large between the solenoid 51 and the armature 71, the force exerted on the valve 52 remains substantially constant for the entire range of the movement of the armature 71. A constant force thus acts on the valve 52, and in consequence the pressure in the region 62 will remain constant. The result is that the multiplication ratio of the multiplier valve 54 remains substantially constant. The opening at conduit 65 thus becomes greater with greater pressure in the compression chamber 55 with the result that the pressure in the compression chamber 55 is maintained substantially constant.

The energization of solenoid 51 will determine the shock-absorbing effect of the shock-absorber. Preferably the energization is of a constant value but may, of course, be made adjustable to get a desirable control for given operating conditions. When the energization is of constant value the resistance of the valve 52 is of a constant value with the result that the pressure in region 62, once it has built up to a value to open valve 52, is constant. The resistance at valve 65 is thus a constant value. The pressure in chamber 55 will thus be kept constant since the opening at 65 will be proportional to the pressure in chamber 55.

Of course, the liquid passing through the valve 52 passes to the region 63 and through conduit 64 to the low pressure region or supply reservoir 56, which is in suitable communication with the region 155 under low pressure through the ball check valve 159 acted upon by a comparatively weak spring 160.

The valve 52 is electrically controlled as shown, namely, a battery 72 has its negative terminal suitably connected to the casing or the sprung mass of the vehicle and has its positive terminal connected to the binding post 73, which binding post has a slider 74 adapted to make contact with the upper contact strip interconnected by the conducting rivet 75 with the lower contact strip and the brush 76 to the electromagnet 51 and thence to the ground or casing 50.

The slider 74 is so positioned with reference to the upper contact strip connected to the rivet 75 and the length of the upper contact strip is so chosen that the controlling action for the valve 52 takes place substantially over the entire range of movement of the piston toward the left when there is an upward vertical acceleration of the casing 50.

In Fig. 2 the piston is shown as having completed a small movement toward the left from an extreme right-hand position. When the movement of the piston is toward the right, the piston will ordinarily be at some position at the left and the slider will, therefore, make no contact with the contact member to energize the electromagnet 51 as shown in Fig. 3. The compression chamber 55 is thus in free communication with the supply reservoir through a valve 159' at the left corresponding to a valve 159 shown at the right-hand end of the piston.

In Fig. 3 valve 159' designates a valve similar to valve 159. The valve 159' is held in seated position by a comparatively light spring 160'. When the piston moves toward the right, liquid can very readily move into the chamber 55'.

When the movement of the piston is toward the left, valve 159' closes and the pressure in chamber 55 and thus 55' is raised, as hereinbefore pointed out. If the pressure in chamber 55 becomes excessive, the pressure relief valve 82' acted upon by a comparatively heavy spring 83' opens to permit a flow of fluid from chamber 55' through valve 82' and conduit 85' to the low pressure chamber 56. Valve 82' is held in the piston structure by the seat 84' firmly mounted in the piston.

For a downward movement, namely, a downward acceleration, the movement of the piston will be toward the right. Liquid in the compression chamber 155 will thus be subjected to pressure, since valves 67 and 159 will be moved to their respective seats. Under these conditions, liquid flow will be forced through the conduit 161, the fluid flow restricting conduit 153 to the region 162. Liquid will also pass through the opening 165 controlled by the multiplier valve 154 and pass the valve 167, which is acted upon by a spring having a considerable force, but which force is less than the force of the spring 83 of the pressure relief valve 82 and greater than the force of the spring 160.

The valve 152 operates in every respect like the valve 52 and thus controls the flow of liquid into region 163 and from 163 through conduit 164 to low pressure region, or chamber 56. The lever 170 controls the valve 152 and is in turn controlled by the armature 171, which is in coaction with the solenoid 151. The solenoid 151 is suitably energized from the battery 72' and a circuit which is in every respect similar to the circuit shown for solenoid 51. Air gap 186 is similar to air gap 86. The binding post 73' for energizing the electromagnet or solenoid 151 is in this instance mounted to co-act with the conducting members 175 and 176 when the piston is at the left and moving toward the right in the manner assumed.

The binding post 73' has a slider 74', similar to 74. The solenoid 151 is energized from a battery 72'. The effective voltage may be varied by the means shown.

The upper or piston portion of the multiplier valve 154, namely, the region 158, is by the conduit 157 in communication with the low pressure reservoir 56, so that the pressure of the liquid in the region 158 does not impair the operation of the multiplier valve 154. A similar arrangement is, of course, seen for the valve 54. That is, the region 58 is in communication with the low pressure reservoir 56 through the conduit 57.

When there is a very rapid relative movement of the piston and the casing, the pressure in the compression chambers may become dangerously high. To eliminate any injury to the equipment, a ball check valve 82 is disposed to coact with the valve seat 84 and is acted upon by a spring 83 exerting a comparatively large force on the valve 82. However, when excessive pressure is developed in the compression chamber 155, liquid will be forced past valve 82 through conduit 85 to the chamber 55 which at such stage of operation is under low pressure. The left-hand end of the piston is also provided with a pressure relief valve similar to the valve 82 as previously described.

Since the various conduits I have shown in Fig. 2 would be difficult to make, in the absence of the use of a plurality of parts, the piston really comprises the main piece 81 having a hollowed-out portion at the right to receive parts 79 and 80. Parts 79 and 80 constitute interfitting parts that fit, as a unit, into the right end of the main piece.

To limit the travel of valves 54 and 154, lugs 87, 88, 187 and 188 are positioned in the chambers for these valves.

The apparatus just described has been described in connection with a shock absorber, but it is apparent that this merely illustrates one application of the use of a motor operated valve for controlling the pressure in a compression chamber. Broadly any means for producing a positive motion of a device is a motor and the electromagnetic devices I have disclosed are thus motors. In the particular instance, the pressure of a liquid in a chamber that is subjected to variable volume is controlled.

The foregoing description of applicant's invention, including several modifications, include his preferred structures, but are not to be interpreted as exhausting the possibilities of his invention, but the descriptive matter and the drawings are only to be considered illustrative of his invention, because it is readily apparent that others skilled in the art, particularly after having had the benefit of the teachings of applicant's invention, can devise other motor operated valves for maintaining a constant pressure in a receptacle and may devise other control means for valves associated with shock absorbers for controlling the shock absorbing action of hydraulic shock absorbers.

I claim as my invention:

1. In apparatus having a chamber of variable volume and containing a fluid which fluid is to be maintained at substantially constant pressure, in combination, a chamber of variable volume, conduit means adapted to permit a flow of fluid from the chamber of variable volume to a region of relatively low fluid pressure, a multiplier valve in the conduit means, a control valve adapted to control the opening of the multiplier valve, whereby the multiplication of the multiplier valve is caused to vary as a function of the operating characteristics of said control valve, and means for maintaining the multiplication of the multiplier valve within a given range.

2. In apparatus operating on fluids, in combination, a chamber containing a fluid, means tending to vary the pressure of the fluid in said chamber, conduit means interconnecting said chamber with a region of relatively low fluid pressure whereby fluid may flow from said chamber to the region of low pressure, a multiplier valve in said conduit means, an inertia controlled valve adapted to control the multiplication of the multiplier valve, and means adapted to maintain the multiplication of the multiplier valve within certain limits.

3. In hydraulic apparatus wherein forces are transmitted by liquids, in combination, a chamber containing a liquid, means for varying the volume of said chamber, conduit means through which liquid may flow from said chamber when subjected to variations of volume, a multiplier valve in said conduit means, control means adapted to control the multiplication of said multiplier valve, and means, coacting with said multiplier valve and the control means, adapted to maintain the multiplications of said multiplier valve within a given range.

4. In hydraulic apparatus wherein forces are transmitted by liquids, in combination, a movable casing having a chamber containing a liquid, means for varying the volume of said chamber, conduit means through which liquid may flow from said chamber when subjected to variations of volume, a multiplier valve in said conduit means, control means adapted to control the multiplication of said multiplier valve, and inertia means coupled to said casing, coacting with said multiplier valve and the control means, responsive to movements of the casing adapted to maintain the pressure in said chamber substantially constant.

5. In hydraulic apparatus wherein forces are transmitted by liquids, in combination, a chamber containing a liquid, means for varying the volume of said chamber, conduit means through which liquid may flow from said chamber when subjected to variations of volume, a multiplier valve in said conduit means, a control valve responsive to inertia adapted to control the multiplication of said multiplier valve, and means, coacting with said multiplier valve and the control means, adapted to maintain the multiplications of said multiplier valve within a given range.

6. In hydraulic apparatus wherein forces are transmitted by liquids, in combination, a chamber containing a liquid, means for varying the volume of said chamber, conduit means through which liquid may flow from said chamber when subjected to variations of volume, a multiplier valve in said conduit means adapted to control the pressure of the liquid in said chamber, a valve and actuating means therefor adapted to control the operation of said multiplier valve, and means adapted to maintain the multiplication of said multiplier valve within a certain range.

7. In hydraulic apparatus wherein forces are transmitted by liquids, in combination, a chamber containing a liquid, means for varying the volume of said chamber, conduit means through which liquid may flow from said chamber when subjected to variations of volume, a multiplier valve in said conduit means adapted to control the pressure of the liquid in said chamber, a valve and actuating means therefor adapted to control the operation of said multiplier valve, and control means comprising a slidable valve and valve guide adapted to control the multiplication of said multiplier valve.

8. In a shock absorber for vehices having a chamber of variable volume and containing a fluid which fluid is to be maintained at substantially constant pressure, in combination, a chamber, piston means for varying the volume of the chamber with relative movements of the sprung and unsprung portions of the vehicle, conduit means adapted to permit a flow of fluid from the chamber of variable volume to a region of relatively flow fluid pressure, a multiplier valve in the conduit means, a control valve adapted to control the opening of the multiplier valve, whereby the multiplication of the multiplier valve is caused to vary as a function of the operating characteristics of said control valve, and means adapted to maintain the multiplication of the multiplier valve within a given range.

9. In a shock absorber for vehicles having a chamber of variable volume and containing a fluid which fluid is to be maintained at substantially constant pressure, in combination, a chamber, piston means for varying the volume of the chamber with relative movements of the sprung and unsprung portions of the vehicle, conduit means adapted to permit a flow of fluid from the chamber of variable volume to a region of relatively low fluid pressure, a multiplier valve in the conduit means, a control valve adapted to control the opening of the multiplier valve, whereby the multiplication of the multiplier valve is caused to vary as a function of the operating characteristics of said control valve, and selectable means adapted to maintain the multiplication of the multiplier valve within a given range of a selected value determined by said selectable means.

10. In a hydraulic shock absorber for vehicles operating on roads and having a sprung mass and an unsprung mass, in combination, a chamber containing a fluid, a piston, operable by the relative movement of the sprung and unsprung masses, adapted to vary the volume of said chamber, conduit means interconnecting said chamber with a region of relatively low fluid pressure whereby fluid may flow from said chamber to the region of low pressure, a control mass mounted on the sprung mass, a valve operated by said control mass whereby the position of the valve is determined by the acceleration of the sprung mass, a multiplier valve, in said conduit the multiplication of which is controlled by said valve operated by the control mass, and means adapted to maintain the multiplication of the multiplier valve within a certain range.

11. In a hydraulic shock absorber for vehicles operating on roads and having a sprung mass and an unsprung mass, in combination, a chamber containing a fluid, a piston, operable by the relative movement of the sprung and unsprung masses, adapted to vary the volume of said chamber, conduit means interconnecting said chamber with a region of relatively low fluid pressure whereby fluid may flow from said chamber to the region of low pressure, inertia means responsive to the acceleration of the sprung mass, multiplier valve means disposed in series with said inertia means having a certain range of multiplication, both said means adapted to control the flow of fluid through said conduit means.

12. In a hydraulic shock absorber for vehicles traveling on roads and having a sprung mass and an unsprung mass, in combination, a chamber containing a liquid, a piston operable by the relative movement of said masses and adapted to vary the volume of said chamber, conduit means through which liquid may flow when leaving said chamber by reason of its variations of volume, a multiplier valve in said conduit means, control means adapted to control the multiplication of said multiplier valve, and means, coacting with said multiplier valve and the control means, adapted to maintain the multiplication of said multiplier valve within a given range.

13. In a hydraulic shock absorber for vehicles traveling on roads and having a sprung mass and an unsprung mass, in combination, a chamber containing a liquid, a piston operable by the relative movement of said masses and adapted to vary the volume of said chamber, conduit means through which liquid may flow when leaving said chamber by reason of its variation of volume, a multiplier valve in said conduit means, a control valve responsive to acceleration of said sprung mass adapted to control the multiplication of said multiplier valve, and means, coacting with said multiplier valve and the control means, adapted to maintain the multiplication of said multiplier valve within a given range.

14. In a hydraulic shock absorber for vehicles traveling on roads and having a sprung mass and an unsprung mass, in combination, a casing mounted on the sprung mass and having a chamber containing a liquid, a piston operable by the relative movement of said masses and adapted to vary the volume of said chamber, conduit means through which liquid may flow when leaving said chamber by reason of its variation of volume, a multiplier valve in said conduit means, control means adapted to control the multiplication of said multiplier valve, and inertia means coupled to the casing, coacting with said multiplier valve and the control means, adapted to maintain the pressure in said chamber substantially constant.

15. In hydraulic shock absorbers for vehicles traveling over roads and having a sprung mass and an unsprung mass, in combination, a chamber containing a liquid, a piston, operable by the relative movement of said masses, adapted to vary the volume of said chamber, conduit means through which liquid may flow from said chamber when subjected to variations in volume, a multiplier valve in said conduit means adapted to control the liquid pressure in said chamber, motor operated valve means adapted to control the operation of said multiplier valve, and means adapted to maintain the multiplication of said multiplier valve within a certain range.

16. In hydraulic shock absorbers for vehicles traveling over roads, and having a sprung mass and an unsprung mass, in combination, a chamber containing a liquid, a piston operable by the relative movement of said masses adapted to vary the volume of said chamber, conduit means through which liquid may flow from said chamber when subjected to variations in volume, a multiplier valve of the poppet type in said conduit means adapted to control the liquid pressure in said chamber, motor operated valve means adapted to control the operation of said multiplier valve, and means adapted to maintain the multiplication of said multiplier valve within a certain range.

17. In hydraulic shock absorbers for vehicles traveling over roads and having a sprung mass and an unsprung mass, in combination, a chamber containing a liquid, a piston operable by the relative movement of said masses adapted to vary the volume of said chamber, conduit means through which liquid may flow from said chamber when subjected to variations in volume, a multiplier valve in said conduit means adapted to control the liquid pressure in said chamber, motor operated valve means adapted to control the operation of said multiplier valve, and control means, comprising a movable valve and a guide therefor, adapted to control the multiplication of said multiplier valve.

18. In hydraulic shock absorbers for vehicles traveling over roads and having a sprung mass and an unsprung mass, in combination, a chamber containing a liquid, a piston operable by the relative movement of said masses adapted to vary the volume of said chamber, conduit means through which liquid may flow from said chamber when subjected to variations in volume, a multiplier valve of the hydrostatically balanced type in said conduit means adapted to control the liquid pressure in said chamber, motor operated valve means adapted to control the operation of said multiplier valve, and control means, comprising a valve and guide means therefor, adapted to control the multiplication of said multiplier valve.

19. In hydraulic shock absorbers for vehicles traveling over roads, and having a sprung mass and an unsprung mass, in combination, a chamber containing a liquid, a piston operable by the relative movement of said masses adapted to vary the volume of said chamber, conduit means through which liquid may flow from said chamber when subjected to variations in volume, a multiplier valve of the poppet type in said conduit means adapted to control the liquid pressure in said chamber, motor operated valve means adapted to control the operation of said multiplier valve, and control means for controlling the multiplication of said multiplier valve.

GAYLORD W. PENNEY.